United States Patent
Cyrille et al.

(10) Patent No.: US 6,842,306 B2
(45) Date of Patent: Jan. 11, 2005

(54) MAGNETIC HEAD HAVING HIGHLY THERMALLY CONDUCTIVE INSULATOR MATERIALS CONTAINING COBALT-OXIDE

(75) Inventors: Marie-Claire Cyrille, San Jose, CA (US); Wen-Chien David Hsiao, San Jose, CA (US); Yongho Sungtaek Ju, San Jose, CA (US); Wen-Yaung Lee, San Jose, CA (US); Stefan Maat, San Jose, CA (US); Howard Gordon Zolla, San Jose, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 272 days.

(21) Appl. No.: 10/284,988

(22) Filed: Oct. 31, 2002

(65) Prior Publication Data
US 2004/0085675 A1 May 6, 2004

(51) Int. Cl.⁷ .............................................. G11B 5/235
(52) U.S. Cl. ..................................................... 360/120
(58) Field of Search ................................ 360/120, 319, 360/121, 119, 125, 126

(56) References Cited

U.S. PATENT DOCUMENTS

| | | | |
|---|---|---|---|
| 4,737,757 A | 4/1988 | Senda ........................ 338/308 |
| 5,378,548 A | 1/1995 | Torii et al. ............. 428/694 TS |
| 6,034,849 A | 3/2000 | Takizawa .................... 360/128 |
| 6,423,240 B1 | 7/2002 | Wang et al. ................... 216/22 |
| 2002/0154456 A1 * | 10/2002 | Carey et al. ........... 360/324.11 |

FOREIGN PATENT DOCUMENTS

| | | | |
|---|---|---|---|
| JP | 2112987 A | | 4/1990 |
| JP | 4252439 | | 9/1992 |
| JP | 10-12437 A | * | 1/1998 |
| JP | 2001068878 A | | 3/2001 |

* cited by examiner

Primary Examiner—Julie Anne Watko
(74) Attorney, Agent, or Firm—John J. Oskorep, Esq.

(57) ABSTRACT

A magnetic head has highly thermally conductive insulator materials containing cobalt-oxide so that heat can more effectively dissipate from the magnetic head. In one illustrative example, the magnetic head has first and second gap layers and a read sensor disposed between the first and the second gap layers. The first and the second gap layers are advantageously made of cobalt-oxide ($CoO_x$) (e.g. CoO or $Co_2O_3$), which may exhibit a thermal conductivity of between 5–8 watts/meter-Kelvin or greater. In another illustrative example, a magnetic head is made of a substrate; first and second shield layers; an undercoat layer formed between the substrate and the first shield layer; first and second gap layers formed between the first and the second shield layers; and a read sensor formed between the first and the second gap layers. The undercoat layer is also made of $CoO_x$. The improved dissipation of heat from the magnetic head improves the read sensor performance and reduces the likelihood of other problems, such as head-to-disk interface problems.

29 Claims, 3 Drawing Sheets

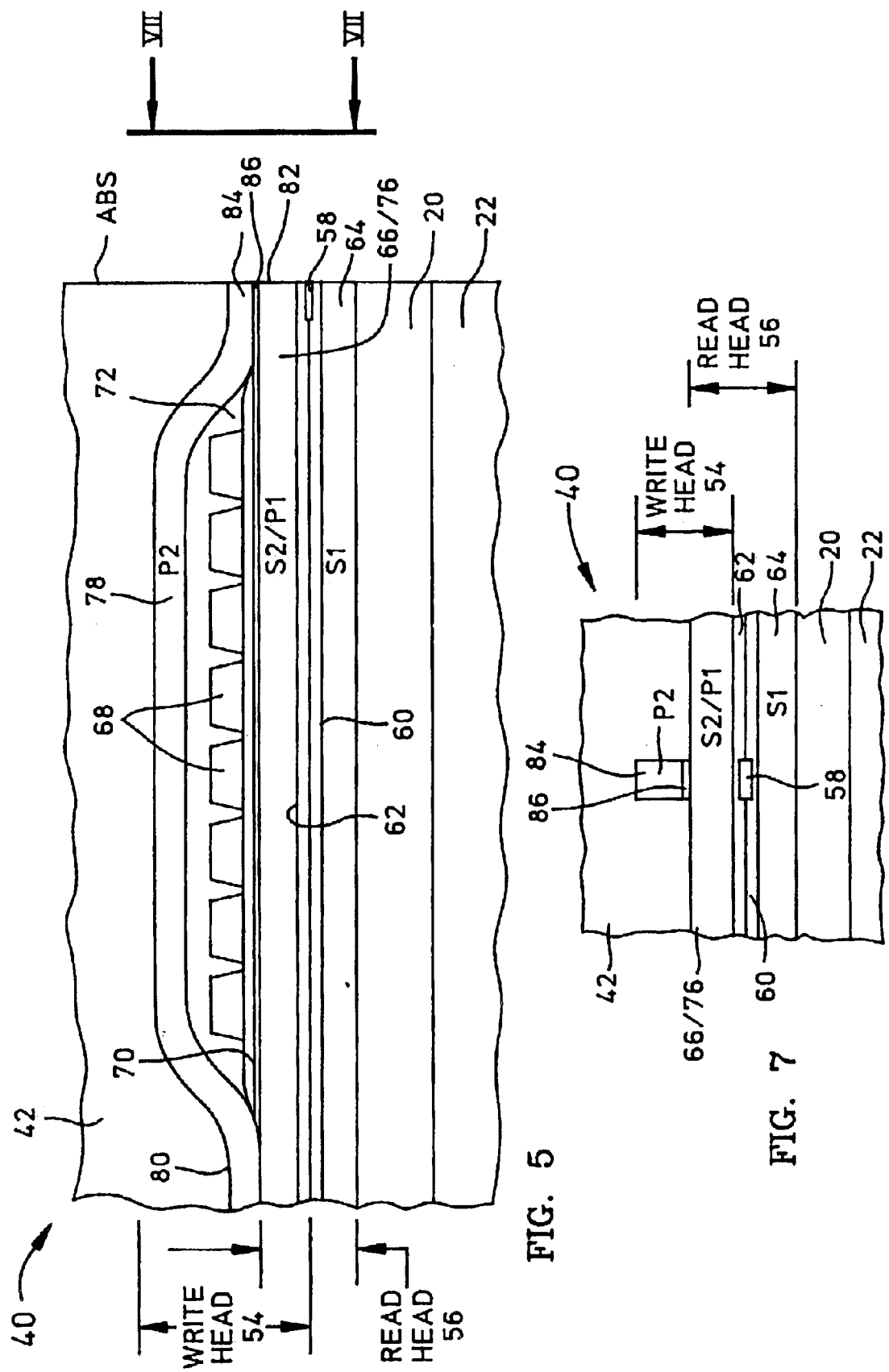

MAGNETIC HEAD HAVING HIGHLY THERMALLY CONDUCTIVE INSULATOR MATERIALS CONTAINING COBALT-OXIDE

BACKGROUND OF THE INVENTION

1. Field of the Invention

This invention relates generally to magnetic heads in disk drives, and more particularly to magnetic heads having insulator materials containing cobalt-oxide which can effectively dissipate heat from the magnetic head.

2. Description of the Related Art

A write head is typically combined with a magnetoresistive (MR) or giant magnetoresistive (GMR) read head to form a merged head, certain elements of which are exposed at an air bearing surface (ABS). The write head comprises first and second pole pieces connected at a back gap that is recessed from the ABS. The first and second pole pieces terminate at the ABS where first and second pole tips are defined. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces magnetic write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR or GMR read head.

An MR read head includes an MR sensor sandwiched between first and second non-magnetic gap layers and located at the ABS. In turn, the first and second gap layers are sandwiched between first and second shield layers. In a merged MR head, the second shield layer and the first pole piece are a common layer. The first shield layer is formed over an undercoat layer, which is in turn formed over a substrate. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

On the other hand, a GMR read head includes a GMR sensor which manifests the GMR effect. In the GMR sensor, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g., nickel-iron, cobalt, or nickel-iron-cobalt) separated by a layer of nonmagnetic material (e.g., copper) are generally referred to as spin valve (SV) sensors which manifest the SV effect. Recorded data can be read from a magnetic medium because the external magnetic field from the recorded magnetic medium (the signal field) causes a change in direction of magnetization in the free layer, which in turn causes a change in resistance of the SV sensor and a corresponding change in the sensed current or voltage. A GMR head is typically associated with a design in which the second shield layer and first pole piece are not a common layer. These pieces are separated by a non-magnetic material or a metal that is typically deposited using a physical vapor deposition technique or an electroplating technique.

When the disk drive is in operation, heat is produced within the magnetic head. If not effectively dissipated, the heat can cause undesirable problems in the magnetic head. For example, the maximum amplitude of a bias current which is applied to the read sensor is limited by the sensor's heat dissipation capability. This limitation imposes a constraint on the readback signal amplitude and the signal-to-noise ratio of the read sensor. Heat conduction cooling of the read sensor is strongly impeded by the use of conventional dielectric gap layers, typically made of alumina ($Al_2O_3$), which physically separate the sensor from the shield layers. The engineering of magnetic materials alone is insufficient to achieve the needed improvement in the read sensor output, especially as recording areal densities continue to increase rapidly. Another problem with heat in the magnetic head is that it may cause several layers in the head to thermally expand during write operations. The thermal expansion of these layers tends to cause mechanical protrusion which, in turn, may cause head-to-disk interface reliability problems.

SUMMARY OF THE INVENTION

According to the present invention, a magnetic head makes use of highly thermally conductive insulator materials containing cobalt-oxide ($CoO_x$) so that heat can more effectively dissipate from the magnetic head.

In one embodiment of the invention, a magnetic head has first and second gap layers and a read sensor disposed between the first and the second gap layers. At least one of the first and the second gap layers are made of cobalt-oxide ($CoO_x$), where x is a real value between 0.8 and 1.5 (e.g. CoO or $Co_2O_3$). Preferably, each gap layer has a resistivity of 1000 ohm-centimeter or greater, and a thermal conductive property of 2 watts/meter-Kelvin (w/m*K) or greater. Advantageously, heat is more effectively dissipated from the magnetic head to improve the performance of the read sensor.

In another embodiment of the invention, a magnetic head is made of a substrate; first and second shield layers; an undercoat layer formed between the substrate and the first shield layer; first and second gap layers formed between the first and the second shield layers; and a read sensor formed between the first and the second gap layers. The undercoat layer is made of cobalt-oxide ($CoO_x$), where x is a real value between 0.8 and 1.5 (e.g. CoO or $Co_2O_3$). Preferably, the undercoat layer has a resistivity of 1000 ohm-centimeter or greater, and a thermal conductivity property of 2 w/m*K or greater. Advantageously, heat can more effectively dissipate from the magnetic head to reduce the risk of mechanical protrusion in the head.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and magnetic read head and write head as seen in plane V—V of FIG. 2, which reveals gap layers formed around a read sensor and an undercoat layer formed between a substrate and a shield layer;

FIG. 7 is a partial ABS view of the slider taken along plane VII—VII of FIG. 5 to show the read and write elements of the magnetic head, which reveals the gap layers formed around the read sensor and the undercoat layer formed between the substrate and the shield layer.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
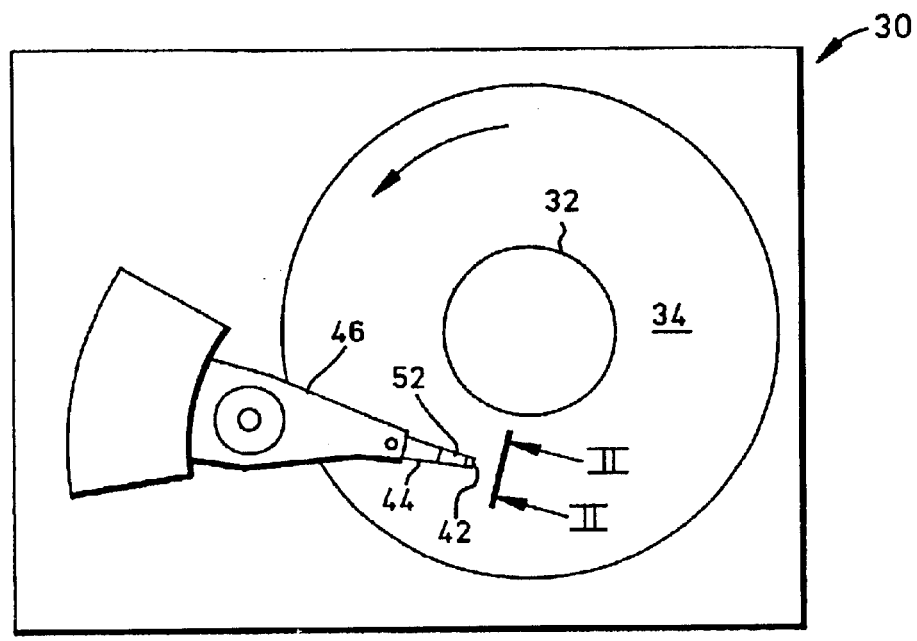
FIG. 1 is a planar view of an exemplary magnetic disk drive.
Figure 2:
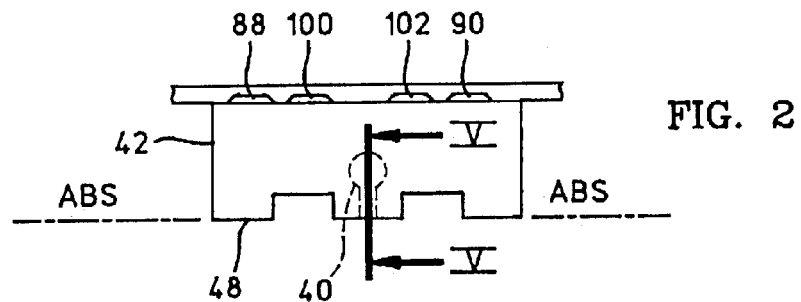
FIG. 2 is an end view of a slider with a magnetic head of the disk drive as seen in plane II—II.
Figure 3:
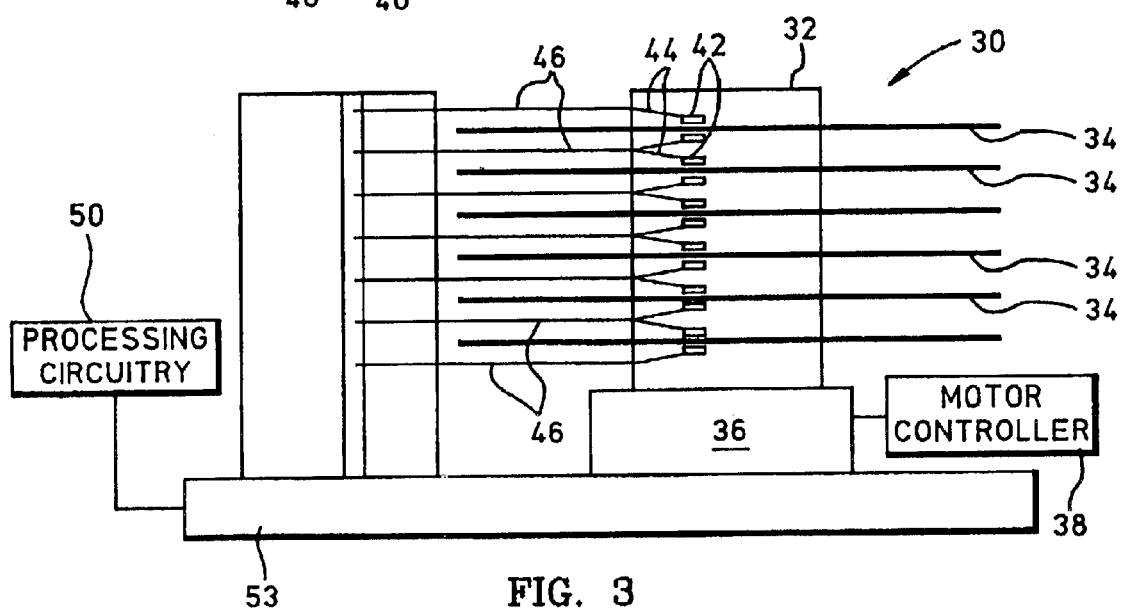
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a conventional magnetic disk drive 30. Disk drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by the motor 36, the slider is supported on a thin (e.g. 0.05 mm) cushion of air (air bearing) between the disk and an air bearing surface (ABS) 48.

Figure 4:
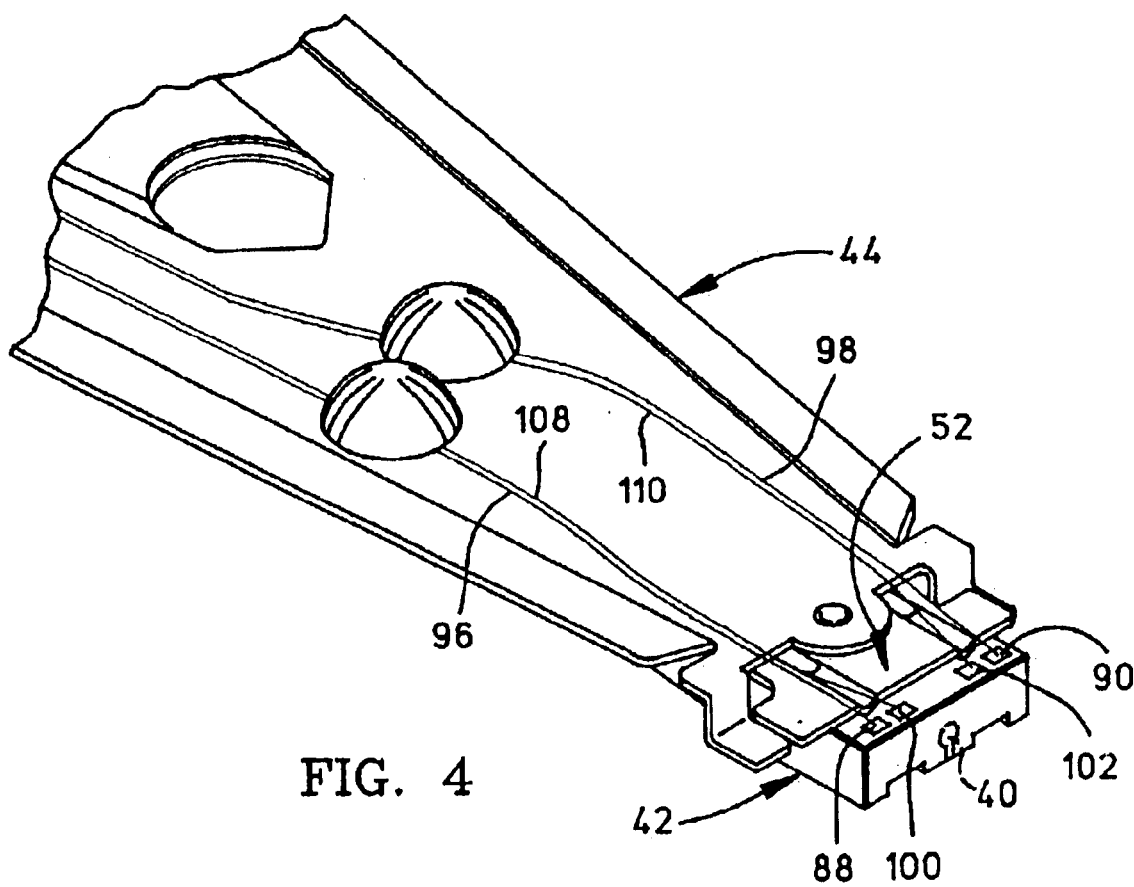
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with head 40, provides motor drive signals, and also provides control signals for moving slider 42 to various tracks. In FIGS. 1 and 4, slider 42 is shown mounted to a head gimbal assembly (HGA) 52 that is mounted to suspension 44. All of the above components are supported on a base 53.

FIG. 5 is a side cross-sectional elevation view of the magnetic head 40 taken along line V–V of FIG. 2, which reveals a write head portion 54 and a read head portion 56 of the head. FIG. 7 is a partial ABS view of the slider taken along plane VII—VII of FIG. 5 which reveals similar features. In the embodiment shown, read head portion 56 includes a read sensor 58 of the magnetoresistive (MR) type. However, read head portion 56 may include any suitable read sensor, such as a giant magnetoresistive (GMR) sensor. During a read operation, the resistance of read sensor 58 changes in response to external magnetic fields. A sense current conducted through the sensor causes these resistance changes to be manifested as potential changes, which are processed by processing circuitry 50 (FIG. 3).

As shown in FIGS. 5 and 7, read sensor 58 is sandwiched between first and second gap layers 60 and 62 that are, in turn, sandwiched between first and second shield layers 64 and 66. Gap layers 60 and 62 are provided to electrically insulate read sensor 58 from first and second shield layers 64 and 66. Gap layers 60 and 62 make contact with the outer capping layers (not shown) of read sensor 58, which are typically made of tantalum (Ta). Below first shield layer 64 is an undercoat layer 20, which is formed over a substrate 22. First and second shield layers 64 and 66 are typically made of a magnetic material, such as Permalloy, and substrate 22 is typically made of ceramic (AlTiC). In the prior art, first and second gap layers 60 and 62 and undercoat layer 20 are typically made of alumina ($Al_2O_3$) which is a dielectric material. Alumina has a resistivity on the order of $10^8$ ohms and a thermal conductivity of between 1.5–2.0 watts/meter-Kelvin (w/m*K).

Figure 6:
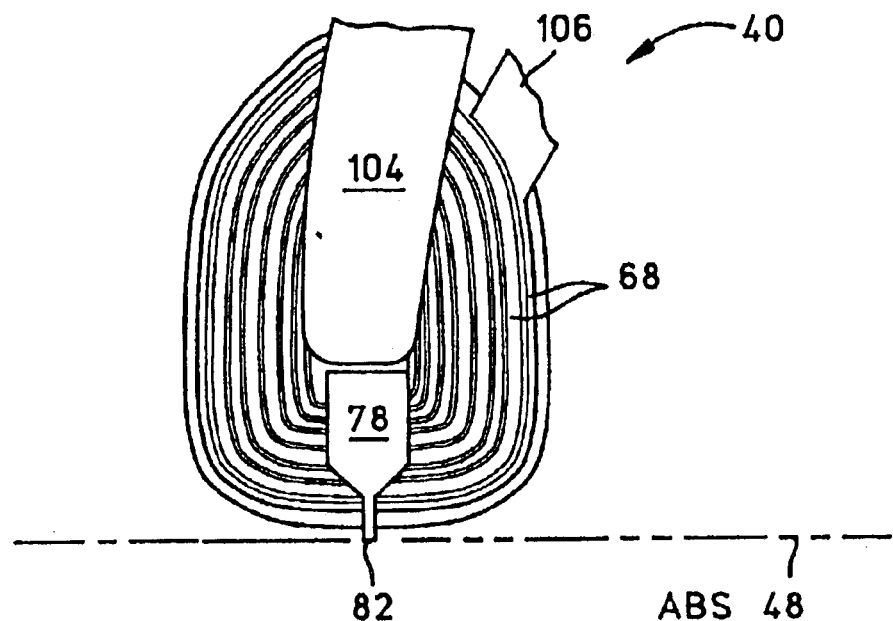
FIG. 6 is a top view of the second pole piece and coil layer, a portion of which is shown in FIG. 5, with all insulation material removed.

Write head portion 54 of the head includes a coil layer 68 sandwiched between first and second insulation layers 70 and 72. First and second insulation layers 70 and 72 are referred to as an "insulation stack". Coil layer 68 and first and second insulation layers 70 and 72 are sandwiched between first and second pole pieces 76 and 78. First and second pole pieces 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from read sensor 58 to leads 96 and 98 on the suspension 44; third and fourth solder connections 100 and 102 connect leads 104 and 106 from the coil 68 (see FIG. 6) to leads 108 and 110 on the suspension.

Referring back to FIGS. 5 and 7, gap layers 60 and 62 and undercoat layer 20 are made of cobalt-oxide ($CoO_x$) in accordance with the present invention. The $CoO_x$ is sufficiently proportioned to make a suitable electrical insulator having a relatively high thermal resistance. When x is a real value between 0.8 and 1.5, it has been observed that the cobalt-oxide has a resistivity of several 1000 ohm-centimeter or greater, as well as a thermal conductivity of between about 2–8 watts/meter-Kelvin (w/m*K). Thus, gap layers 60 and 62 and undercoat layer 20 are preferably made of $CoO_x$ where x is a real value between 0.8 and 1.5. Such a cobalt-oxide insulator has a resistivity greater than 1000 ohm-centimeter and a thermal conductivity of 2 w/m*K or greater. More preferably, the $CoO_x$ utilized is CoO (x=1), $Co_2O_3$ (x=1.5), or combinations thereof, which are stable. Also, gap layers 60 and 62 and undercoat layer 20 are preferably made entirely of $CoO_x$ insulator.

The cobalt-oxide may be formed as gap layers 60 and 62 and undercoat layer 20 using any suitable conventional process. For example, the layers may be applied using conventional reactive sputtering (e.g. under the ambient of argon and oxygen gas mixture), ion beam sputtering evaporation, or RF sputtering techniques. Each one of gap layers 60 and 62 is formed with a thickness of between about 50 and 1000 Angstroms, and in the present embodiment each gap layer has a thickness of about 200 Angstroms. With cobalt-oxide, each gap layer 60 and 62 provides a resistance greater than 1 megaohm between read sensor 58 and the shield. Undercoat layer is formed with a thickness of between about 0.5 and 5 micrometers ($\mu$m), and in the present embodiment has a thickness of about 3–4 $\mu$m. However, any suitable thickness for these layers may be utilized.

Table 1 below provides a comparison of measurements of thermal resistances of a few dielectric materials, including cobalt-oxide ($CoO_x$).

TABLE 1

| FILM | $CoO_x$ | $Al_2O_3$ | $SiO_x$ | AlN doped with Si, O |
|---|---|---|---|---|
| THERMAL CONDUCTIVITY (w/m*K) | 5–8 | 1.5–2 | 1–1.5 | 3–4 |

The thermal conductivity of these films were characterized using thin-film four-point probe heater structures that were patterned by lithography. The $CoO_x$ was prepared using reactive sputtering methods. Significantly, the thermal conductivity of cobalt-oxide films is approximately a factor of four larger than that of the sputtered aluminum-oxide films.

Advantageously, heat is more effectively dissipated from the magnetic head using the cobalt-oxide insulator materials. The use of such highly thermally conductive thin films as gap layers around the read sensor improves the heat dissipation of the read sensor and hence its signal output. Also, improved heat conduction through the undercoat layer reduces the temperature rise during write operations to thereby reduce any mechanical protrusion and head-to-disk interface problems.

As described herein, a magnetic head makes use of highly thermally conductive insulator materials containing cobalt-oxide ($CoO_x$) so that heat can more effectively dissipate from the magnetic head. In one particular application, the magnetic head has first and second gap layers and a read sensor disposed between the first and the second gap layers. At least one of the first and the second gap layers are made of cobalt-oxide ($CoO_x$), where x is a real value between 0.8 and 1.5. Preferably, the $CoO_x$ gap layers have a resistivity of 1000 ohm-centimeter or greater, and a thermal conductivity of 2 watts/meter-Kelvin (w/m*K) or greater. Most preferably, the $CoO_x$ utilized is CoO (x=1), $Co_2O_3$ (x=1.5), or combinations thereof. Advantageously, heat can be more effectively dissipated from the magnetic head to improve the performance of the read sensor.

In another particular application, a magnetic head is made of a substrate; first and second shield layers; an undercoat layer formed between the substrate and the first shield layer; first and second gap layers formed between the first and the second shield layers; and a read sensor formed between the first and the second gap layers. The undercoat layer is made of cobalt-oxide ($CoO_x$), where x is a real value between 0.8 and 1.5. Preferably, the undercoat layer has a resistivity of 1000 ohm-centimeter or greater, and a thermal conductivity of 2 w/m*K or greater. Most preferably, the $CoO_x$ utilized is CoO (x=1), $Co_2O_3$ (x=1.5), or combinations thereof. Advantageously, heat can be more effectively dissipated from the magnetic head to alleviate the aforementioned problems and others.

It is understood that cobalt-oxide may be utilized in only one layer or part of the magnetic head, even though its simultaneous use in different parts has been described. It is also understood that a functional layer of the magnetic head may use multiple layers of different materials, one or more of which may include a cobalt-oxide layer. For example, a gap layer (or undercoat) may include a first sublayer of cobalt-oxide and a second sublayer of aluminum-oxide, tantalum-oxide, zirconium-oxide, zinc-oxide, silicon-nitride, aluminum-nitride, or combinations thereof. In cases such as these, it is preferred that the cobalt-oxide layer constitute a majority of or dominate the entire layer.

The above is merely a description of preferred embodiments of the invention and it is understood that various changes, alterations, and variations may be made without departing from the true spirit and scope of the invention as set for in the appended claims. For example, although the use of cobalt-oxide in a magnetic head of the MR type has been described in detail, it may be used in a magnetic head of the GMR type in the same way. None of the terms or phrases in the specification and claims has been given any special particular meaning different from the plain language meaning to those skilled in the art, and therefore the specification is not to be used to define terms in an unduly narrow sense.

What is claimed is:

1. A magnetic head, comprising:
   first and second gap layers;
   a read sensor disposed between the first and the second gap layers; and
   at least one of the first and the second gap layers comprising cobalt-oxide ($CoO_x$).

2. The magnetic head of claim 1, wherein the at least one gap layer comprising cobalt-oxide ($CoO_x$) is an electrical insulator.

3. The magnetic head of claim 1, wherein the at least one gap layer comprising cobalt-oxide ($CoO_x$) has a thermal conductivity of 2 watts/meter-Kelvin (w/m*K) or greater.

4. The magnetic head of claim 1, wherein x is a real value between about 0.8 and 1.5.

5. The magnetic head of claim 1, wherein the cobalt-oxide comprises one of CoO and $Co_2O_3$.

6. The magnetic head of claim 1, wherein the at least one gap layer comprising cobalt-oxide ($CoO_x$) has a thermal conductivity of 2 watts/meter-Kelvin (w/m*K) or greater and thermally conducts heat away from the read sensor.

7. The magnetic head of claim 1, wherein the at least one gap layer comprising cobalt-oxide ($CoO_x$) thermally conducts heat away from the read sensor to improve the performance of the read sensor.

8. A magnetic recording device, comprising:
   at least one magnetic disk;
   a spindle supporting the at least one magnetic disk;
   a disk drive motor for rotating the at least one magnetic disk;
   a magnetic head for reading data from the at least one magnetic disk;
   a slider which supports the magnetic head;
   the magnetic head comprising:
      first and second gap layers;
      a read sensor disposed between the first and the second gap layers; and
      at least one of the first and the second gap layers comprising cobalt-oxide ($CoO_x$).

9. The magnetic recording device of claim 8, wherein the at least one gap layer comprising cobalt-oxide ($CoO_x$) is an electrical insulator.

10. The magnetic recording device of claim 8, wherein the at least one gap layer comprising cobalt-oxide ($CoO_x$) has a thermal conductivity of 2 watts/meter-Kelvin (w/m*K) or greater.

11. The magnetic recording device of claim 8, wherein x is a real value between about 0.8 and 1.5.

12. The magnetic recording device of claim 8, wherein the cobalt-oxide comprises one of CoO and $Co_2O_3$.

13. The magnetic recording device of claim 8, wherein the at least one gap layer comprising cobalt-oxide ($CoO_x$) has a thermal conductivity of $_2$ watts/meter-Kelvin (w/m*K) or greater and thermally conducts heat away from the read sensor.

14. The magnetic recording device of claim 8, wherein the at least one gap layer comprising cobalt-oxide ($CoO_x$) thermally conducts heat away from the read sensor to improve the performance of the read sensor.

15. A magnetic head, comprising:
   a substrate;
   first and second shield layers;
   an undercoat layer formed between the substrate and the first shield layer;
   first and second gap layers formed between the first and the second shield layers;
   a read sensor formed between the first and the second gap layers; and
   the undercoat layer comprising cobalt-oxide ($CoO_x$).

16. The magnetic head of claim 15, wherein the undercoat layer comprising cobalt-oxide ($CoO_x$) is an electrical insulator.

17. The magnetic head of claim 15, wherein the undercoat layer comprising cobalt-oxide ($CoO_x$) has a thermal conductivity of 2 watts/meter-Kelvin (w/m*K) or greater.

18. The magnetic head of claim 15, wherein x is a real value between about 0.8 and 1.5.

19. The magnetic head of claim 15, wherein the cobalt-oxide comprises one of CoO(x=1) and $Co_2O_3$(x=1.5).

20. The magnetic head of claim 15, wherein the undercoat layer comprising cobalt-oxide ($CoO_x$) has a thermal conductivity of 2 watts/meter-Kelvin (w/m*K) or greater and thermally conducts heat away from the read sensor.

21. The magnetic head of claim 15, wherein the undercoat layer comprising cobalt-oxide ($CoO_x$) thermally dissipates heat in the magnetic head to reduce thermal expansion.

22. The magnetic head of claim 15, further comprising:
   at least one of the first and the second gap layers comprising cobalt-oxide ($CoO_x$).

23. A magnetic recording device, comprising:
   at least one magnetic disk;
   a spindle supporting the at least one magnetic disk;
   a disk drive motor for rotating the at least one magnetic disk;
   a magnetic head for reading data from the at least one magnetic disk;
   a slider for supporting the magnetic head;
   the magnetic head comprising:
      a substrate;
      first and second shield layers;
      an undercoat layer formed between the substrate and the first shield layer;
      first and second gap layers formed between the first and the second shield layers;
      a read sensor formed between the first and the second gap layers; and
      the undercoat layer comprising cobalt-oxide ($CoO_x$).

24. The magnetic recording device of claim 23, wherein the undercoat layer comprising cobalt-oxide ($CoO_x$) is an electrical insulator.

25. The magnetic recording device of claim 23, wherein the undercoat layer comprising cobalt-oxide ($CoO_x$ has a thermal conductivity of 2 watts/meter-Kelvin (w/m*K) or greater.

26. The magnetic recording device of claim 23, wherein x is a real value between about 0.8 and 1.5.

27. The magnetic recording device of claim 23, wherein the cobalt-oxide comprises one of CoO and $Co_2O_3$.

28. The magnetic recording device of claim 23, wherein the undercoat layer comprising cobalt-oxide ($CoO_x$) has a thermal conductivity of 2 watts/meter-Kelvin (w/m*K) or greater and thermally conducts heat away from the read sensor.

29. The magnetic recording device of claim 23, wherein the undercoat layer comprising cobalt-oxide ($CoO_x$) thermally dissipates heat in the magnetic head to reduce thermal expansion.

* * * * *

UNITED STATES PATENT AND TRADEMARK OFFICE
CERTIFICATE OF CORRECTION

PATENT NO. : 6,842,306 B2
DATED : January 11, 2005
INVENTOR(S) : Cyrille et al.

It is certified that error appears in the above-identified patent and that said Letters Patent is hereby corrected as shown below:

Title page,
Item [73], Assignee, should read -- Hitachi Global Storage Technologies Netherlands B.V., Amsterdam (NL) --.

Signed and Sealed this

Seventeenth Day of January, 2006

JON W. DUDAS
*Director of the United States Patent and Trademark Office*